F. G. & W. F. NIEDRINGHAUS.
Water-Coolers.

No. 206,816. Patented Aug. 6, 1878.

WITNESSES:
Saml. S. Boyd
Paul Bakewell

INVENTORS.
Frederick G. Niedringhaus,
William F. Niedringhaus
By Chas. D. Moody,
their atty.

UNITED STATES PATENT OFFICE.

FREDERICK G. NIEDRINGHAUS AND WILLIAM F. NIEDRINGHAUS, OF ST. LOUIS, MISSOURI.

IMPROVEMENT IN WATER-COOLERS.

Specification forming part of Letters Patent No. 206,816, dated August 6, 1878; application filed December 12, 1876.

*To all whom it may concern:*

Be it known that we, FREDERICK G. NIE-DRINGHAUS and WILLIAM F. NIEDRINGHAUS, of St. Louis, Missouri, have made new and useful Improvements in Water-Coolers, of which the following is a full, clear, and exact description, reference being had to the annexed drawing, making part of this specification, in which—

Figure 1:
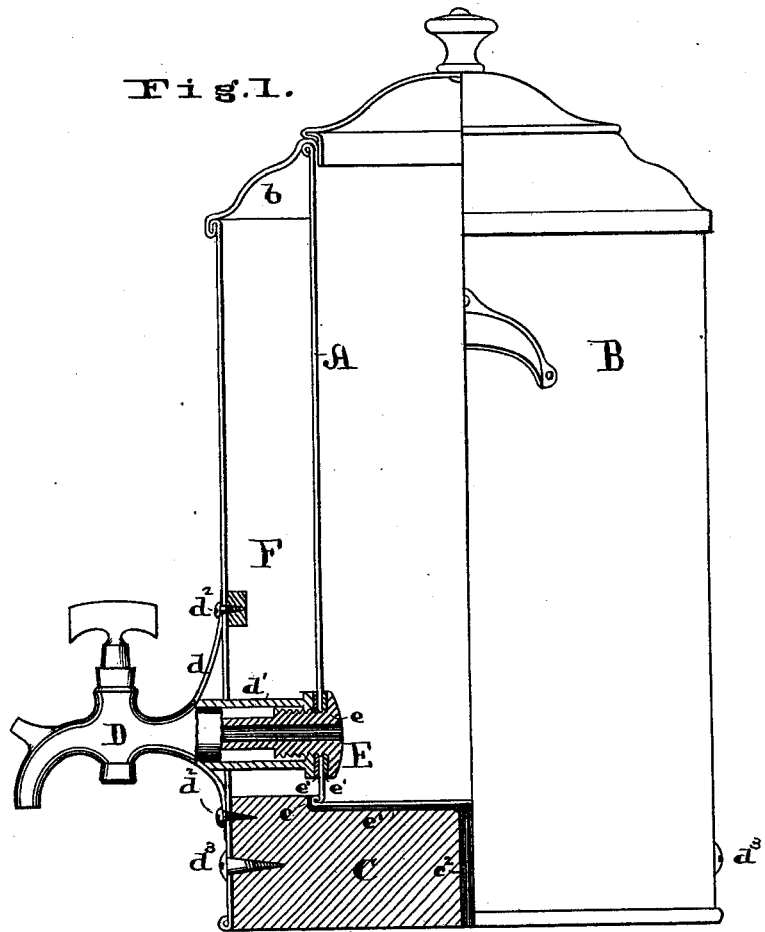
Figure 2:
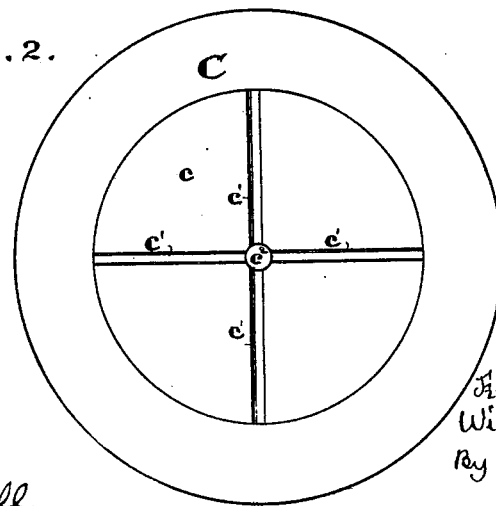

Figure 1 is an elevation, partly in section, and Fig. 2 a plan of the base, of the cooler.

Similar letters refer to similar parts.

The present invention has this advantage: The various parts composing the cooler can be finished separately and then put together, and in such a way as to be readily taken apart whenever desired. This not only enables any portion of the structure to be easily reached for repair or renewal, but also allows the two casings to be entirely coated with an enamel, if desired. A firm foundation is furnished for the inner or water chamber, and provision is made for the drainage of the chamber included between the casings.

In the annexed drawing, A represents the casing inclosing the inner or water chamber, and B the outer casing of the cooler. The former rests directly upon a detachable base or foundation, (preferably made of wood,) C, Figs. 1 and 2, in the top of which is a shallow recess, $c$, to receive the bottom of the casing A, the latter bearing directly upon the bottom of the recess, as shown. The inner edge of the top $b$ of the outer casing rests upon the top of the inner casing, A, and the lower end of the casing B extends down outside and around the base C.

D represents the faucet. It has a boss, $d$, that bears against the outer side of the casing B, and a tubular shank, $d^1$, that extends through the casing B and nearly to the inner casing, A, and that on the inside of the inner end is threaded to screw onto a threaded tube, E, that projects outwardly through an opening in the casing A. The tube E is provided with a head, $e$, to keep it from being drawn through the opening. Washers $e'$ $e'$ are arranged on the tube E, one on the inner and one on the outer side of the casing A.

While our invention is useful in water-coolers composed of sheet metal finished in the ordinary way, we preferably coat the two casings A and B, both on their inner and their outer sides, with an enamel. The several parts of the cooler are then united by passing the casing B over the casing A and base C, and by screwing the faucet D onto the tube E. The latter operation draws the washers $e'$ $e'$ and the parts immediately therewith connected tightly against the casing A, closing the opening around the tube E. The boss $d$ may be fastened at $d^2$ $d^2$ to the casing B. Screws $d^3$ $d^3$ fasten the casing B to the base C.

The usual packing may be inserted in the space F between the casings; but we preferably leave this space vacant, relying on the air only as a non-conductor. All the parts are now firmly joined.

The base C sustains the inner chamber especially, and is useful in supporting the entire structure.

Moisture is apt to collect on the outer side of the casing inclosing the water-chamber of a cooler and in the chamber between the two casings of a cooler. To provide for the removal of this moisture, we make the recess $c$ in the base C slightly larger in diameter than the casing A. This allows the drip to run down into the recess. It thence flows through grooves $c^1$ $c^1$ in the bottom of the recess to a central outlet, $c^2$, leading down through the base C.

The cooler can be easily taken apart by removing the screws $d^3$ $d^3$ and detaching the faucet D.

What we claim is—

1. In a water-cooler, the combination of the inner chamber, A, and the solid base C, the latter having the flat-bottomed recess $c$, the grooves $c^1$ $c^1$, and outlet $c^2$, and the bottom of the chamber bearing directly and continuously upon the bottom of the recess, substantially as described and shown.

2. The combination, in a water-cooler, of the casings A and B and the base C, the outer casing at the top resting loosely upon the top of the inner casing and at the bottom extending down and around the base, which, in turn, supports the inner casing and holds it and the outer casing together, substantially as described.

3. The combination of the casings A and B with the base C and screws $d^3$ $d^3$, the several parts being detachable from and relatively united to one another, substantially as described.

F. G. NIEDRINGHAUS.
WM. F. NIEDRINGHAUS.

Witnesses:
SAML. S. BOYD,
CHAS. D. MOODY.